Patented Jan. 29, 1946

2,393,827

UNITED STATES PATENT OFFICE 2,393,827

ETHERS OF SECONDARY NITROALKANES AND METHOD OF PREPARING THEM

Murray Senkus, Terre Haute, Ind., assignor to Commercial Solvents Corporation, Terre Haute, Ind., a corporation of Maryland No Drawing. Application June 15, 1944, Serial No. 540,538

4 Claims. (Cl. 260—614)

This invention relates to novel ethers of secondary nitroalkanes having the following structural formula and to a method for preparing them

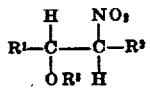

in which $R^1$ may be hydrogen or alkyl and $R^2$ and $R^3$ represent alkyl radicals.

An object of the present invention is to provide a new series of nitro ethers of the class described.

A further object of the invention is to provide a novel method for preparing alkyl ethers of secondary nitroalkanes.

These and other objects are accomplished by my invention in which I react mono- or dialkyl secondary nitroethanes with alkaline alcoholates in alcohol solutions.

In practicing my invention, I first prepare a solution of an alcoholate of an alkali metal by any suitable method, for example, by dissolving the alkali metal or alkali metal hydroxide in an alcohol corresponding to the ether desired, for example, I use methyl alcohol to dissolve the alkaline methoxide if a methoxy compound is desired, ethyl alcohol to dissolve the alkaline ethoxide to produce an ethoxy compound, etc.

Better yields of the nitroethers are obtained when the water content of the reaction mixture is low, as the presence of water promotes the formation of nitroalcohols rather than the desired ethers. For this reason, the alkali solution may be made with anhydrous alcohols, especially in cases where the alkali hydroxide rather than the alkali metal is used to form the alcoholate, as commercial solid alkali hydroxides contain appreciable quantities of water. Small quantities of water in the reaction mixture do not seriously affect the yield of ether, and commercial aqueous alcohols such as 95% ethyl alcohol can be used where precautions are taken to limit the total quantity of water introduced with all the components of the reaction mixture.

To the alkaline alcoholate solution I add the desired mono- or dialkyl secondary nitroethane slowly with vigorous stirring at temperatures not appreciably exceeding room temperature, and preferably considerably below such temperature, for example, between about 0 and 20° C. After the reaction is complete the product is present as the metallic salt, and may be recovered as such if desired. If the free ether is desired, the solution is acidified with a weak acid, for example, with acetic acid, releasing an oily layer of the desired ether which is recovered by distillation. Satisfactory yields are obtained, varying somewhat according to the particular ether produced, and usually between about 15 and 40% of theoretical.

The alcoholate used may be that of any convenient alkali, for example, sodium or potassium and the like. Sodium is preferred because of its cheapness and ready availability.

The mechanism of the reaction is not completely understood, but a possible explanation is, that the metal alcoholate formed ionizes, whereupon the negative alkyloxy group attaches itself at the No. 2 carbon and the positive alkali metal ion associates itself with the negative ion of the aci form of the nitro group. Upon acidification, the nitro ether is created.

The steps may be represented somewhat as follows:

$R^1CH=CH-NO_2R^3 \xrightarrow{MOR^2}$

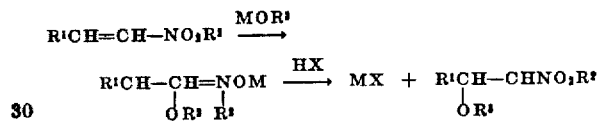

where M is alkali metal, $R^1$ may be hydrogen or alkyl and $R^2$, and $R^3$ are alkyl radicals, and X represents the positive radical of the acid used.

Whatever the mechanism of the reaction, I find that the method functions well to yield the ethers of the type described, of which the following may be mentioned as examples; 3-nitro-2-methoxypentane, from 3-nitro-2-pentene and methyl alcohol; 3-nitro-4-ethoxyhexane from 3-nitro-3-hexene and ethyl alcohol; 2-nitro-1-butoxybutane from 2-nitro-1-butene and butyl alcohol; and 3-nitro-4-butoxyhexane from 3-nitro-3-hexene and butyl alcohol; and so on.

In many cases, for example, where the ethers are to be used as intermediates in further syntheses, it may be desirable to recover the ether in the form of its alkali metal salt, as many syntheses employ reactants in this form, and in such cases the acidification of the reaction product of the metal alcoholate and the nitroolefin will be unnecessary, and the salt may readily be recovered after its formation in the manner described.

As illustrative of the method of preparing the ethers of my invention, the following examples are given:

EXAMPLE I

*Preparation of 3-nitro-2-methoxypentane*

To 23 parts of 3-nitro-2-pentene, was added slowly, 250 parts of a 25% anhydrous methanol solution of potassium methoxide at 0° C. The reaction mixture was acidified with acetic acid and was extracted with ether. Rectification of the ether extract resulted in a 28% yield of 3-nitro-2-methoxypentane.

Boiling point 48° C. at 2 mm. $d_4^{23}=1.0089$. $n_D^{23}=1.4307$. Nitrogen calculated 9.52; found 9.71.

EXAMPLE II

*Preparation of 2-nitro-1-butoxybutane*

To 23 parts of 2-nitro-1-butene were added slowly 250 parts of a 25% solution of sodium butoxide in butanol at about 0° C. After completion of the reaction the mixture was acidified with acetic acid and was extracted with ether. Rectification of the ether extract resulted in a 13½% yield of 2-nitro-1-butoxybutane, B. P. 71° @ 2 mm.

Nitrogen calculated 8.00, found 7.89.

EXAMPLE III

*Preparation of 3-nitro-4-ethoxyhexane*

Four parts of sodium (0.17 mole) were dissolved in 350 parts of anhydrous ethyl alcohol. To this solution were added 100 parts of 3-nitro-3-hexene (.77 mole) at 20°. The solution was allowed to stand in the room for 2 days. To this solution were added 20 parts (0.3 mole) of acetic acid and the mixture was poured into 1500 parts of water. The non-aqueous layer was washed with two 250 part portions of water and rectified in vacuo through a 3-plate Snyder column at a 3:1 reflux ratio. This rectification gave 27 parts of unconverted 3-nitro-3-hexene, 35 parts of 3-nitro-4-ethoxyhexane, B. P. 85–87° at 9 mm. and 6 parts of material, boiling range 87–9% at 9 mm. There were also 27 parts of residue. Conversion to nitro ether, 24%; yield, 36%.

Analysis: Calculated for $C_8H_{17}NO_3$: N, 8.00. Found: N, 8.37. $d_4^{25}$ 0.9702; $n_D^{25}$ 1.4278.

My invention provides a simple and useful method for preparing nitro ethers of the class described which are useful as intermediates in various organic syntheses.

While the above description points out the preferred embodiments of my invention it will be understood that departures can be made therefrom within the scope of the specification and claims.

What is claimed is:

1. In a process for preparing ethers of secondary nitroalkanes having the following structural formula

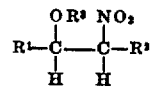

in which $R^1$ is a member selected from the group consisting of hydrogen and alkyl, and $R^2$ and $R^3$ are alkyl radicals, the steps which comprise reacting a nitroolefine of the following structure

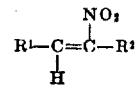

in which $R^1$ is a member selected from the group consisting of hydrogen and alkyl, and $R^3$ is an alkyl radical with an alcoholate of an alkali metal and thereafter acidifying and recovering the product.

2. In a process for preparing 3-nitro-2-methoxypentane, the steps which comprise reacting 3-nitro-2-pentene with a methoxide of an alkali metal in methyl alcohol solution and thereafter acidifying and recovering the product.

3. In a process for preparing 3-nitro-4-ethoxyhexane, the step which comprises reacting 3-nitro-3-hexene with an ethoxide of an alkali metal in ethyl alcohol solution and thereafter acidifying and recovering the product.

4. In a process for preparing 2-nitro-1-butoxybutane, the step which comprises reacting 2-nitro-1-butene with butoxide of an alkali metal in butyl alcohol solution and thereafter acidifying and recovering the product.

MURRAY SENKUS.

---

Certificate of Correction

Patent No. 2,393,827.     January 29, 1946.

MURRAY SENKUS

It is hereby certified that error appears in the printed specification of the above numbered patent requiring correction as follows: Page 1, first column, line 47, for "nitroethane" read *nitroethene*; and that the said Letters Patent should be read with this correction therein that the same may conform to the record of the case in the Patent Office.

Signed and sealed this 30th day of April A. D. 1946.

[SEAL]

LESLIE FRAZER,
*First Assistant Commissioner of Patents.* will be unnecessary, and the salt may readily be recovered after its formation in the manner described.

As illustrative of the method of preparing the ethers of my invention, the following examples are given:

EXAMPLE I

*Preparation of 3-nitro-2-methoxypentane*

To 23 parts of 3-nitro-2-pentene, was added slowly, 250 parts of a 25% anhydrous methanol solution of potassium methoxide at 0° C. The reaction mixture was acidified with acetic acid and was extracted with ether. Rectification of the ether extract resulted in a 28% yield of 3-nitro-2-methoxypentane.

Boiling point 48° C. at 2 mm. $d_4^{23}=1.0089$. $n_D^{23}=1.4307$. Nitrogen calculated 9.52; found 9.71.

EXAMPLE II

*Preparation of 2-nitro-1-butoxybutane*

To 23 parts of 2-nitro-1-butene were added slowly 250 parts of a 25% solution of sodium butoxide in butanol at about 0° C. After completion of the reaction the mixture was acidified with acetic acid and was extracted with ether. Rectification of the ether extract resulted in a 13½% yield of 2-nitro-1-butoxybutane, B. P. 71° @ 2 mm.

Nitrogen calculated 8.00, found 7.89.

EXAMPLE III

*Preparation of 3-nitro-4-ethoxyhexane*

Four parts of sodium (0.17 mole) were dissolved in 350 parts of anhydrous ethyl alcohol. To this solution were added 100 parts of 3-nitro-3-hexene (.77 mole) at 20°. The solution was allowed to stand in the room for 2 days. To this solution were added 20 parts (0.3 mole) of acetic acid and the mixture was poured into 1500 parts of water. The non-aqueous layer was washed with two 250 part portions of water and rectified in vacuo through a 3-plate Snyder column at a 3:1 reflux ratio. This rectification gave 27 parts of unconverted 3-nitro-3-hexene, 35 parts of 3-nitro-4-ethoxyhexane, B. P. 85–87° at 9 mm. and 6 parts of material, boiling range 87–9% at 9 mm. There were also 27 parts of residue. Conversion to nitro ether, 24%; yield, 36%.

Analysis: Calculated for $C_8H_{17}NO_3$: N, 8.00. Found: N, 8.37. $d_4^{25}$ 0.9702; $n_D^{25}$ 1.4278.

My invention provides a simple and useful method for preparing nitro ethers of the class described which are useful as intermediates in various organic syntheses.

While the above description points out the preferred embodiments of my invention it will be understood that departures can be made therefrom within the scope of the specification and claims.

What is claimed is:

1. In a process for preparing ethers of secondary nitroalkanes having the following structural formula

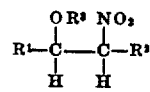

in which $R^1$ is a member selected from the group consisting of hydrogen and alkyl, and $R^2$ and $R^3$ are alkyl radicals, the steps which comprise reacting a nitroolefine of the following structure

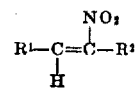

in which $R^1$ is a member selected from the group consisting of hydrogen and alkyl, and $R^3$ is an alkyl radical with an alcoholate of an alkali metal and thereafter acidifying and recovering the product.

2. In a process for preparing 3-nitro-2-methoxypentane, the steps which comprise reacting 3-nitro-2-pentene with a methoxide of an alkali metal in methyl alcohol solution and thereafter acidifying and recovering the product.

3. In a process for preparing 3-nitro-4-ethoxyhexane, the step which comprises reacting 3-nitro-3-hexene with an ethoxide of an alkali metal in ethyl alcohol solution and thereafter acidifying and recovering the product.

4. In a process for preparing 2-nitro-1-butoxybutane, the step which comprises reacting 2-nitro-1-butene with butoxide of an alkali metal in butyl alcohol solution and thereafter acidifying and recovering the product.

MURRAY SENKUS.

---

Certificate of Correction

Patent No. 2,393,827.     January 29, 1946.

MURRAY SENKUS

It is hereby certified that error appears in the printed specification of the above numbered patent requiring correction as follows: Page 1, first column, line 47, for "nitroethane" read *nitroethene*; and that the said Letters Patent should be read with this correction therein that the same may conform to the record of the case in the Patent Office.

Signed and sealed this 30th day of April A. D. 1946.

[SEAL]

LESLIE FRAZER,
*First Assistant Commissioner of Patents.*